J. M. CARPENTER.
TOOL HOLDER.
APPLICATION FILED MAY 21, 1915.
1,160,042.
Patented Nov. 9, 1915.
2 SHEETS—SHEET 1.
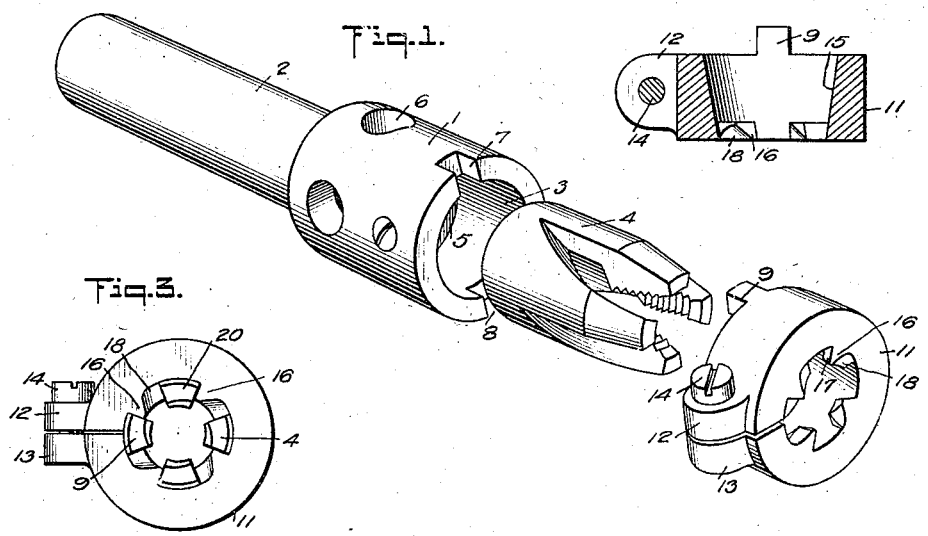
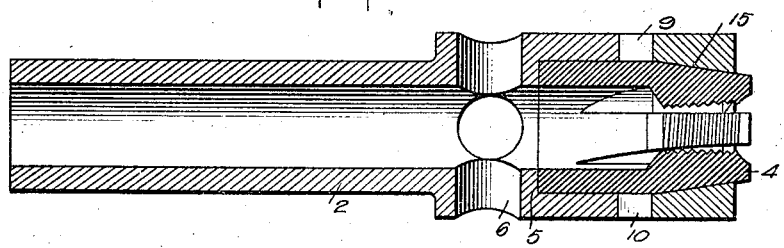
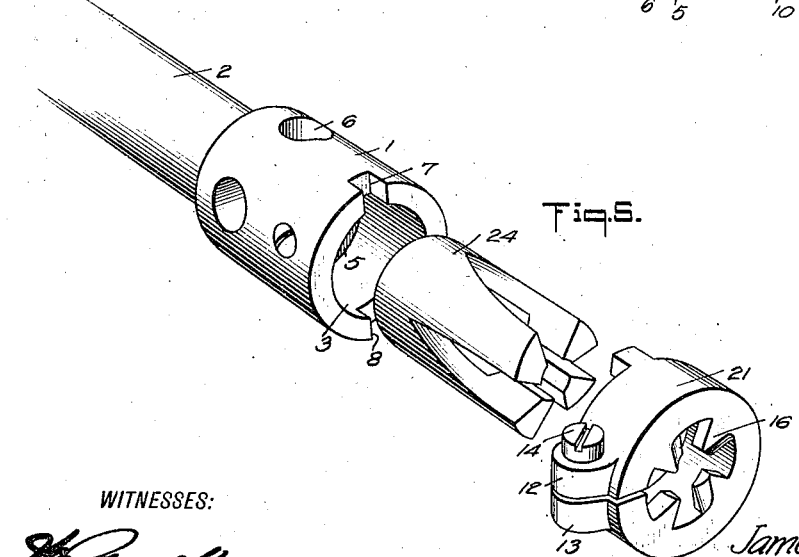
WITNESSES:
INVENTOR
James M. Carpenter
BY
ATTORNEY J. M. CARPENTER.
TOOL HOLDER.
APPLICATION FILED MAY 21, 1915.
1,160,042.
Patented Nov. 9, 1915.
2 SHEETS—SHEET 2.
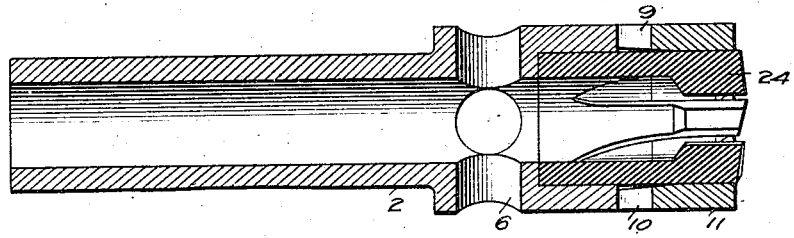
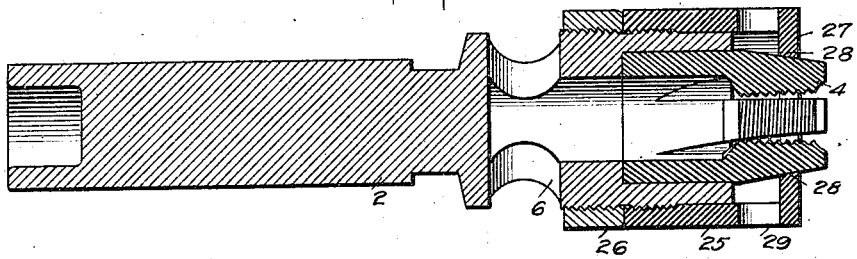
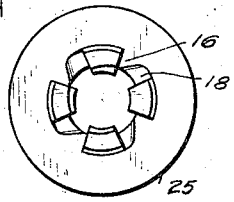
WITNESSES:
INVENTOR
James M. Carpenter
BY
ATTORNEY

UNITED STATES PATENT OFFICE.

JAMES M. CARPENTER, OF PAWTUCKET, RHODE ISLAND.

TOOL-HOLDER.

1,160,042.

Specification of Letters Patent.

Patented Nov. 9, 1915.

Application filed May 21, 1915. Serial No. 29,582.

*To all whom it may concern:*

Be it known that I, JAMES M. CARPENTER, a citizen of the United States, and a resident of Pawtucket, in the county of Providence and State of Rhode Island, have invented a new and Improved Tool-Holder, of which the following is a full, clear, and exact description.

This invention relates to an improved tool holder and has for an object the provision of an improved socket for receiving a tool and a holding member coacting with the socket for causing the tool to correctly and accurately operate.

Another object of the invention is to provide a holder for pronged tools which may be adjusted to vary the size of the tool while preventing any torsional movement of the prongs.

A further object of the invention is to provide in a tool holder a sleeve formed with bracing members or dogs engaging the outer end of the prongs of a tool in such a manner as to prevent any torsional movement of the prongs while guiding the material cut by the prongs to a proper discharge point.

In the accompanying drawings:—Figure 1 is a perspective view of an embodiment of the invention, the parts being separated for purposes of illustration; Fig. 2 is a longitudinal vertical section through the structure shown in Fig. 1, the same being, however, in an assembled condition; Fig. 3 is an end view of the structure shown in Fig. 2; Fig. 4 is a sectional view through the bracing and clamping sleeve shown in Fig. 1; Fig. 5 is a view similar to Fig. 1 but showing the device adapted to a different form of pronged tool; Fig. 6 is a longitudinal vertical section through the structure shown in Fig. 5, the same being assembled; Fig. 7 is an end view of the structure shown in Fig. 6; Fig. 8 is a sectional view through the sleeve shown in Fig. 5; Fig. 9 is a view similar to Fig. 6 but disclosing a slightly modified form of sleeve to that shown in Fig. 5; Fig. 10 is an end view of the structure shown in Fig. 9.

In constructing tool holders, and particularly holders for pronged tools, as for instance, pronged dies, pronged reamers and pronged end mills, means must be provided for holding the tool in place and also for rotating the same so as to cause the proper action thereof when the work is held stationary. When the work is rotated it is of course evident that the tool holder and die, end mill or other tool must remain stationary. If this securing or retaining means is arranged at the base or back of the cutting portion of the instrument, there will be a side movement, or rather, a torsional movement of the prongs of the tool, which is more or less objectionable and which in the instance of a die will cause the threads to not be cut perfect. The degree of imperfection of the threads depends upon the amount of strain on the prongs, which strain naturally causes the prongs to bow or move in a substantially circular direction at the outer end, though pivoting around a center substantially half way of the length of the die or mill. In order to overcome or eliminate these objections and to cause the cutting portions of the pronged tool to operate without any distortion, a sleeve is provided which braces the outer end of each of the prongs and prevents any movement of the outer end independent of the remaining part of the tool, whereby the instrument will act in a perfect manner. The prongs of the tool of whatever nature are intended to be held against distortion whether the tool is rotated when the work is held stationary or the work is rotated and the tool is held stationary. It is of course evident that when the tool is held stationary the tendency of the prongs will be to twist or become distorted in the same manner as if the tool was rotated and the work held stationary. The dogs on the sleeve are adapted to properly hold the outer end of the prongs against distortion under all conditions and thereby produce a proper working position for the tool.

Referring to the accompanying drawings by numerals, 1 indicates a socket member provided with a shank 2, said socket member being formed with a socket 3 for receiving a tool 4, which tool rests against the bottom 5. A plurality of radial bores 6 extend through the socket 3, as more clearly shown in Fig. 2, so that access may be readily had to the base or bottom of the die 4. The socket member 1 is provided with notches 7 and 8 for receiving the lugs 9 and 10 of sleeve 11. It is evident that one, two or any other suitable number of notches and lugs could be provided without departing from the spirit of the invention. The sleeve 11 is provided with a pair of ears 12 and 13 for receiving the clamping screw 14 whereby the sleeve may be contracted or reduced in diameter in order to cause the same to squeeze or move radially inwardly the prongs of the die 4.

As shown in Fig. 2, the sleeve 11 is provided with a beveled surface 15 which mates with the bevel of the prongs of die 4 and thereby allows the clamping screw 14 to easily contract or move radially inwardly said prongs. In addition to being formed with a beveled portion 15, a plurality of dogs 16 are provided, there being one dog for each of the prongs of die 4, said dogs being formed with a squared portion 17 on one side for engaging the rear side face of the respective prongs and of the inclined section 18, which inclined section extends to the next prong of the die, as shown in Fig. 3. For instance, the dog 16 which engages the rear face of prong 19 has a beveled portion 18 extending to the prong 20, and the dog 16 engaging the rear face of prong 20 has a beveled portion extending to the next prong, and so on for all the prongs. The beveled portions 18 act as a guide for guiding the shavings or the cut of the die outwardly and thereby discharge the same exteriorly of the die.

By providing the screw 14 and associated parts the prongs may be moved radially inwardly until the proper adjustment is secured and the dogs 16 present means for preventing any torsional or twisting movement of the prongs. During the operation the tendency is to move the prongs in a circular direction, both in a vertical and a horizontal plane, which naturally would cause the cutting of comparatively poor threads. By providing the dogs 16 no movement of the prongs would be permitted independent of the sleeve 11 and the socket member 10 whereby the teeth of the die must squarely and properly meet the material being threaded.

In forming the sleeve 11, sometimes it is desirable to construct the same exactly as shown in Figs. 1 to 4, inclusive, so as to receive the pronged die having beveled prongs, while at other times it is desirable to form the sleeve so as to receive a pronged die without the bevels or pronged cutter without bevels. In an instance of this kind a sleeve 21 is provided having the dogs 16 as in the preferred structure, but interiorly being formed with a short beveled portion 22 and with a straight portion 23 for engaging the peripheral part of the prongs of the tool 24. Aside from the arrangement of the bevel 22 and the straight portion 23 the construction is similar to that shown in the preferred form and therefore will need no additional description.

In Figs. 9 and 10 will be seen a further modified form of the invention in which the sleeve 25 is used, which sleeve is secured in place by threads and held against accidental movement by any desirable means, as for instance lock nut 26. The sleeve 25 is preferably straight interiorly but is provided with an end 27 having beveled or cam portions 28 engaging the upper surface of the die 4, as more clearly shown in Fig. 9, so that when the sleeve is screwed in one direction the prongs will be contracted or moved radially inwardly. The end 27, in addition to the beveled portion 28, is provided with dogs 16 as in the preferred form, so as to brace the prongs and present discharge bevels 18 for disposing of the material to be cut from the article being threaded.

Sometimes during the manufacture of the dies 4 the teeth do not properly aline after tempering, which will cause some of the rear teeth to scrape the threads cut by the outer teeth and thereby produce some fine shavings that must be eliminated. The sleeve 25 is provided with a plurality of openings 29 in order that these shavings may be easily removed.

In all three forms of the invention it will be observed that the same form of dog is used for bracing and holding the prongs of the respective cutting tools against distortion. These dogs are intended to hold the outer end of the prongs of the tools in their original position while under strain, whereby a perfect thread or perfect cut is produced. In the form shown in Figs. 1 to 7 a split sleeve is provided which is operated for squeezing the prongs and thereby moving the same radially inwardly, while in the form shown in Figs. 9 and 10 the prongs are moved radially inwardly by the longitudinal movement of the sleeve and pressure of the beveled or cam portions 28 against the beveled portion of the die.

What I claim is:—

1. In a tool holder of the character described, the combination with a socket member for receiving a pronged tool, of a sleeve co-acting with said socket member, said sleeve telescoping over the prongs of said tool, means arranged on said sleeve for squeezing or moving radially inwardly the prongs of said tool, and a dog on said sleeve for each of the prongs of said tool for holding all of said prongs in their normal position with respect to the base of the tool, whereby no distortion of the prongs can take place.

2. In a tool holder of the character described, the combination with a socket member for receiving a pronged tool, a ring or sleeve connected with said socket member, said sleeve being formed with a plurality of bracing dogs engaging the rear face of each of the prongs of said tool, each of said dogs having a chip or shaving guiding portion, and means acting on the sleeve for causing the same to move the prongs of said tool radially.

3. In a holder for pronged dies, a sleeve adapted to fit over the prongs of the die, said sleeve being split on one side, means for drawing said sleeve together at the split portion so as to contract or reduce the diameter of the sleeve and thereby contract said prongs, and a dog for each of said prongs arranged on said sleeve, said dogs holding said prongs in their original position when under tension.

4. In a tool holder for pronged dies, a sleeve split on one side, a dog on said sleeve for each of the prongs of said tool, said dog being arranged to engage the rear face of each of said prongs for preventing a circular distortion of the prongs and for guiding the shavings from the tool to a point exteriorly of the sleeve, and a screw member for drawing said split portions together and move said prongs radially inwardly.

5. In a holder for pronged tools, a sleeve adapted to fit over the prongs of the tool, and a plurality of dogs on said sleeve, each of said dogs being formed with a bracing portion fitting against the respective prongs for holding the prongs in their original position while under tension, and a beveled guiding portion for guiding the shavings produced by the tool to a point exteriorly of the sleeve.

6. In a tool holder of the character described, a socket member for receiving a pronged tool, said tool having prongs with beveled outer portions, a sleeve arranged on said socket member and provided with beveled portions for engaging the beveled portion of the prongs, means for moving the sleeve toward the socket member whereby the beveled portion of the sleeve will contract or move radially inwardly the prongs of the tool, and a dog arranged on said sleeve for each of the prongs of said tool, said dogs being formed with a bracing portion for holding the prongs in their original position and with a beveled chip or shavings guiding portion for guiding the material cut by the tool to a point exteriorly of the sleeve.

7. In a tool holder of the character described, a member for receiving a pronged tool, a sleeve formed so as to be connected with said member, said sleeve having a beveled portion and a straight tubular portion, said straight tubular portion fitting against the periphery of the outer ends of the prongs of said tool, means for contracting said sleeve so as to contract or move radially inwardly said prongs, and a bracing dog for each of the prongs arranged on said sleeve.

8. A tool holder having a body formed with a socket for receiving a pronged tool, and means associated with said body for preventing any movement of the prongs of said tool in the direction of the tension or strain on the tool, said means including bracing dogs having guideways for directing the shavings or chips to a point away from the tool.

9. In a tool holder, a retaining member for holding a pronged cutting tool, said retaining member being formed with means for contracting the cutting portion of said tool, said means including a clamping member for contracting the retaining member and means for preventing any independent movement of the prongs except the movement for contracting said cutting portion, said last mentioned means being so constructed as to direct the chips and shavings to a point away from the tool.

10. In a die holder for pronged dies, a sleeve adapted to fit over the prongs of a die, said sleeve being split at one point, a plurality of dogs mounted on said sleeve and engaging the rear face of each of said prongs for preventing any circular distortion of the prongs either in a horizontal plane transverse of the axis of the die or in a plane parallel with the axis of the die, and means for contracting said sleeve and for moving said dogs radially inwardly.

11. In a die holder, a sleeve adapted to receive a pronged die, said sleeve being provided with a dog for each of said prongs, said dogs being arranged to engage the rear face of each of said prongs for preventing a circular distortion of the prongs, and means for contracting said sleeve so as to move said prongs radially inwardly.

12. In a device of the character described, the combination with a pronged die, of a holder therefor, said holder being provided with a body and with a sleeve, said sleeve being arranged with dogs engaging the prongs of said die for preventing a circular distortion of said prongs, said dogs being formed with a guide for directing the chips from the die to a point away from the sleeve.

13. In a device of the character described, the combination with a pronged die, of a holder therefor, said holder comprising a body for receiving the base of the die and a sleeve adapted to be connected with said body, said sleeve being split at one point, said sleeve being also formed with beveled portions adapted to engage the prongs of said die and move the same radially inwardly, means for contracting the sleeve and thereby cause said beveled portions to move said prongs radially inwardly, and means arranged on said sleeve coacting with said beveled portions for preventing independent displacement of the prongs in a circular direction, said means being provided with a guide for directing the chips away from the die.

14. In a device of the character described, the combination with a die having prongs, of a holder therefor, said holder comprising a body and a sleeve, said sleeve being split so that the same may be contracted and said sleeve being also formed with inclined portions or planes for each of said prongs, a dog engaging each of the prongs for resisting any side bowing movement thereof, and means arranged adjacent said split portions of the sleeve for contracting the sleeve and for moving said dogs radially inwardly, the contracting of the sleeve causing said prongs to move radially inwardly.

15. In a device of the character described, the combination with a die formed with prongs having beveled upper surfaces, of a holder comprising a body and a sleeve, said body being formed with a socket for receiving the said die and said sleeve being formed with members having inclined planes or beveled portions and stops or dogs, said inclined portions acting against the upper surface of said prongs for moving the prongs radially inwardly and the stops or dogs against the sides of the respective prongs for preventing any independent rotary movement of the prongs, said stops or dogs being formed with a guideway for directing the chips away from said die.

In testimony whereof I have signed my name to this specification in the presence of two subscribing witnesses.

JAMES M. CARPENTER.

Witnesses:
ALBERT H. WHEELER,
F. IRVING ENTWISTLE.